(12) United States Patent
Kessler et al.

(10) Patent No.: US 9,740,004 B2
(45) Date of Patent: Aug. 22, 2017

(54) PUPIL-EXPANDED BIOCULAR VOLUMETRIC DISPLAY

(71) Applicants: David Kessler, Rochester, NY (US); Christopher Thomas Grabowski, San Jose, CA (US)

(72) Inventors: David Kessler, Rochester, NY (US); Christopher Thomas Grabowski, San Jose, CA (US)

(73) Assignee: Making Virtual Solid—California LLC., San Jose, CA (US)

( * ) Notice: Subject to any disclaimer, the term of this patent is extended or adjusted under 35 U.S.C. 154(b) by 292 days.

(21) Appl. No.: 14/730,488

(22) Filed: Jun. 4, 2015

(65) Prior Publication Data
US 2015/0355461 A1  Dec. 10, 2015

Related U.S. Application Data

(60) Provisional application No. 62/008,194, filed on Jun. 5, 2014.

(51) Int. Cl.
| | | |
|---|---|---|
| G02B 27/01 | (2006.01) | |
| G02B 27/00 | (2006.01) | |
| G02B 27/22 | (2006.01) | |

(52) U.S. Cl.
CPC ..... *G02B 27/0103* (2013.01); *G02B 27/0081* (2013.01); *G02B 27/0101* (2013.01); *G02B 27/2285* (2013.01); *G02B 2027/011* (2013.01); *G02B 2027/0132* (2013.01); *G02B 2027/0134* (2013.01)

(58) Field of Classification Search
CPC .............. G02B 27/81; G02B 2027/11; G02B 2027/132
See application file for complete search history.

(56) References Cited

U.S. PATENT DOCUMENTS

| | | |
|---|---|---|
| 5,422,812 A | 6/1995 | Knoll |
| 6,381,068 B1 | 4/2002 | Harada |
| 7,056,119 B2 | 6/2006 | Cabato |

(Continued)

FOREIGN PATENT DOCUMENTS

| | | | |
|---|---|---|---|
| JP | 2016199150 A | * | 12/2016 |
| WO | WO2005121707 | | 12/2005 |

*Primary Examiner* — Charlie Y Peng
(74) *Attorney, Agent, or Firm* — Louis S. Horvath

(57) ABSTRACT

A volumetric imaging apparatus is energizable to form an image onto a display surface as an input to a monocentric catadioptric imaging apparatus having a light path for image-bearing light from the display surface, wherein the light path extends substantially symmetrically to a vertical plane that extends through a curved relay mirror and a curved primary mirror. The monocentric catadioptric imaging apparatus has reflective surfaces to fold the light path between the curved relay mirror and the curved primary mirror to condition the distribution of the image-bearing light in a horizontal direction. The light path of the monocentric catadioptric imaging apparatus directs light from the curved primary mirror toward a light input surface of a vertical pupil expander that has a light exit surface that is substantially orthogonal to the vertical plane. The light exit surface directs light through a free-form corrector for convergence and toward a windshield for display.

17 Claims, 16 Drawing Sheets

(56) References Cited

U.S. PATENT DOCUMENTS

| | | | |
|---|---|---|---|
| 7,391,573 B2 | 6/2008 | Amitai | |
| 8,441,733 B2 | 5/2013 | Kessler | |
| 2001/0013974 A1* | 8/2001 | Araki | G02B 5/1814 |
| | | | 359/566 |
| 2006/0126182 A1 | 6/2006 | Levola | |
| 2007/0008241 A1* | 1/2007 | Dobschal | G02B 27/0101 |
| | | | 345/7 |
| 2008/0218870 A1* | 9/2008 | Lind | G02B 17/0621 |
| | | | 359/630 |
| 2014/0247433 A1* | 9/2014 | Piehler | G03B 21/14 |
| | | | 353/94 |
| 2015/0212320 A1* | 7/2015 | Hervy | G02B 27/0101 |
| | | | 345/7 |
| 2016/0193922 A1* | 7/2016 | Kuzuhara | G03B 21/28 |
| | | | 345/7 |
| 2016/0291325 A1* | 10/2016 | Kasahara | G02B 27/0101 |
| 2017/0023788 A1* | 1/2017 | Irzyk | G02B 5/3016 |
| 2017/0090198 A1* | 3/2017 | Takagi | F21V 23/0464 |
| 2017/0115485 A1* | 4/2017 | Saito | G02B 27/0149 |

* cited by examiner

PUPIL-EXPANDED BIOCULAR VOLUMETRIC DISPLAY

CROSS REFERENCE TO RELATED APPLICATIONS

This application claims the benefit of U.S. Provisional application U.S. Ser. No. 62/008,194, provisionally filed on Jun. 5, 2014, entitled "COMPACT VOLUMETRIC DISPLAY FOR CAR NAVIGATIONAL SYSTEMS" in the name of David Kessler, incorporated herein by reference in its entirety.

FIELD OF THE INVENTION

This invention generally relates to volumetric imaging and more particularly relates to a volumetric imaging apparatus using a pupil expander in a single dimension.

BACKGROUND OF THE INVENTION

Three-dimensional (3-D) imaging has recognized value in a number of applications as diverse as medical imaging, visualization technologies, and navigational guidance systems. Advantaged over 2-D display methods and devices, 3-D imaging techniques help to improve how well image data can be represented to a viewer and provide useful characteristics that allow a measure of depth perception that can be particularly valuable in such applications.

A number of 3-D imaging methods are available for more closely representing objects as they appear in space. Stereoscopic imaging apparatus, for example, operate by forming separate images for the left and right eyes of a viewer. Typically, some type of device, such as polarized glasses or other device, is needed in order to separate the two images and allow a measure of stereoscopic viewing. Auto-stereoscopic viewing apparatus can form a 3-D image without the need for a separation device, using virtual imaging methods for forming left and right eye pupils for the viewer at appropriate points in space. However, such devices must compensate for viewer movement out of the pupil space in order to successfully provide a suitable stereoscopic image.

While stereoscopic and auto-stereoscopic imaging apparatus provide the appearance of 3-D, however, the imaging methods that are used provide only a limited number of psychological depth cues. True depth perception is based on a complex interaction of the visual system and related brain processes that we use to recognize and locate positions in space. Stereoscopic and auto-stereoscopic systems simulate convergence which is an aspect of depth position, but fail to provide the visual cues for focal accommodation. Parallax, for example, is observable only over a limited viewing zone. The perspective of the stereoscopic pair is correct for only a small distance. Overall, stereoscopic depth cues can tend to conflict with physical cues, leading to visual confusion and fatigue, as well as to misjudgment of distance, velocity, and shape. This conflict is known in the art as the "convergence-accommodation discrepancy". For reasons such as these, stereoscopic techniques can be inappropriate for navigational guidance applications, such as for use in heads-up displays.

Unlike stereoscopic methods, volumetric display methods actually form a true volume image that provides realistic physical depth cues, such as focal accommodation, parallax, convergence, and biocular disparity. A volumetric display operates by forming an image whose light rays, from the position of the viewer, are substantially indistinguishable from light rays that would appear to the viewer for an actual object.

One useful application of volumetric imaging systems is for use in navigational guidance. For example, International Publication No. WO 2005/121707 entitled "En-route Navigation Display Method and Apparatus Using Head-up Display" by Grabowski et al. describes a navigational display system that forms an image of an overhead cable or other element for guiding the driver of a motor vehicle to a destination, much in the manner of following a cable. The volumetric imaging apparatus that is used forms a true volume image as a virtual image using the windshield or other surface that is disposed in front of the driver. In the volumetric imaging optical apparatus, a light source is rapidly scanned along a screen or diffusive element for forming the image of a "virtual cable". During each scan, the diffusive surface vibrates or uses some other method for rapidly changing the focus during a scan.

While the methods and apparatus taught in the '1707 Grabowski et al. application provide the benefits of volumetric imaging for improved navigational guidance, however, implementation of such a system comes at a cost. The optical system needed to support volumetric imaging is hampered by its size requirements and by the complexity of its aspherical optical components. Lenses used are characterized by large diameters, resulting in high cost, placement constraints, and difficulty of mounting.

In light of these and other considerations, desirable characteristics of an improved, commercially viable volumetric display for use in automotive and vehicular environments include the following:
  a) high image quality;
  b) correction of convergence errors induced by the windshield;
  c) compactness of the imaging optics, without noticeable impact on dashboard, windshield, or instrument panel design; and
  d) sizable eye-box and sufficiently large image area for comfortable viewing without eye-strain, with pupil sizing that accommodates the positioning of the driver, the vehicle dashboard, and the windshield.

Thus, it can be seen that there is room for improvement in volumetric imaging for navigational guidance and other applications.

SUMMARY OF THE INVENTION

It is an object of the present invention to advance the art of volumetric image display. With this object in mind, the present invention provides a volumetric imaging apparatus comprising:
  a volumetric image generator that is energizable to form an image on a display surface as an input to a monocentric catadioptric imaging apparatus,
  the monocentric catadioptric imaging apparatus having a light path for image-bearing light from the display surface, wherein the light path extends substantially symmetrically with respect to a vertical plane that extends through a curved relay mirror and a curved primary mirror,
  wherein the monocentric catadioptric imaging apparatus comprises a plurality of reflective surfaces disposed to fold the light path between the curved relay mirror and the curved primary mirror to condition the distribution of the image-bearing light in a horizontal direction that is substantially orthogonal to the vertical plane, wherein the light path of the monocentric catadioptric imaging apparatus directs light from the curved primary mirror toward a light input surface of a vertical pupil expander, wherein the vertical pupil expander has a light exit surface that is substantially orthogonal to the vertical plane, and wherein the light exit surface directs light through a free-form corrector for horizontal convergence and toward a windshield for display.

Embodiments according to the present disclosure provide a compact optical system by implementing pupil expansion in one dimension only, while maintaining the biocular characteristic of the system, in which the same image is viewed by both the left and right eyes.

It is an advantage of the present invention that it provides a volumetric image having true parallax and perspective for use in navigational guidance and other applications and it corrects for the convergence errors common with windshield reflection.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present disclosure, it is believed that the invention will be better understood from the following description when taken in conjunction with the accompanying drawings.

DETAILED DESCRIPTION OF THE INVENTION

Figure 1:
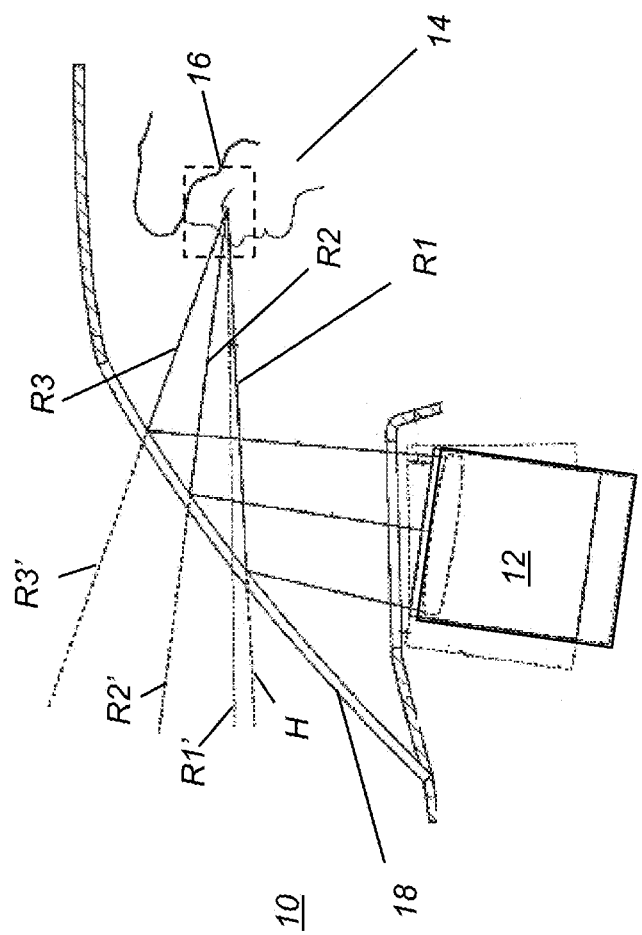
FIG. 1 is a schematic block diagram that shows an existing volumetric imaging apparatus for use in a motor vehicle.

The present description is directed in particular to elements forming part of, or cooperating more directly with, apparatus in accordance with the invention. It is to be understood that elements not specifically shown or described may take various forms well known to those skilled in the art.

Figures shown and described herein are provided in order to illustrate key principles of operation and component relationships along their respective optical paths according to the present invention and are not drawn with intent to show actual size or scale. Some exaggeration may be necessary in order to emphasize basic structural relationships or principles of operation. Some conventional components that would be needed for implementation of the described embodiments, such as various types of optical mounts, for example, are not shown in the drawings in order to simplify description of the invention itself. For example, the source of the image data that is displayed is not shown, but it can be appreciated that image data can be generated from any of a number of sources, including computer devices, cameras, and stored data, for example.

In the drawings and text that follow, like components are designated with like reference numerals, and similar descriptions concerning components and arrangement or interaction of components already described are omitted. Where they are used, the terms "first", "second", and so on, do not denote any ordinal or priority relation, but are simply used to more clearly distinguish one element from another.

The term "oblique" or "oblique angle" has its conventional meaning, as relating to an angular relationship that is either greater than or less than a right (90 degree) angle and not parallel with respect to its reference, that is, not an integer multiple of 90 degrees. An oblique angle is considered to be an angle that differs from the nearest multiple of 90 degrees by at least 8 degrees.

Two geometric features, such as lines or planes, are considered to be substantially parallel if they are parallel to within 8 degrees or less. Two geometric features, such as lines or planes, are considered to be substantially orthogonal if they are orthogonal to within 8 degrees or less. An optical path is considered to be substantially symmetrical to a plane when the plane bisects the majority of its curved and flat surfaces.

The term "optical axis" has its conventional meaning for each of the embodiments described subsequently. With rotationally symmetrical optics, the optical axis simply corresponds to the axis of rotational symmetry. However, with asymmetric optics, the optical axis is more generally defined as the path taken by a ray that is centered in the aperture of the light-concentrating optical component. For cylindrical optics, there may be an axis of symmetry with respect to a plane; this may or may not correspond to the optical axis. With a cylindrical optical device, the optical axis is in the plane where there is optical power orthogonal to the direction along which the cylindrical device is extended. For clarity, the term optical axis is used in the following description as relative to a single refractive or reflective optical component, rather than relative to the larger optical system that comprises multiple components. The more general term "optical path" is used herein to describe the path taken by a particular beam of light, from one component to the next in the optical system of the present disclosure.

The term "mirror" is used as a general term to refer to a reflective surface. This may be a mirrored or coated surface or may be an uncoated surface of a component used for its reflective properties, such as a prism.

In the context of the present disclosure, the optical term "retro reflector" relates to a reflective element that is used to fold the light path in an optical system so that input and output axes overlap. With use of a retro reflector, light that is traveling in opposite directions generally follows along the same path. Use of retro reflective optics can help to shorten the total track of the optical system or a subsystem for a more compact arrangement. Retro reflector approaches introduce the problem of light separation, so that the input beam and output beam are properly routed into and out from the light path. Embodiments of the present disclosure employ polarization of light and the use of polarization beam splitters to join and separate light paths to and from retro reflecting devices.

"Free-form" optical surfaces include surfaces of various shapes, wherein the surfaces are not surfaces of revolution. Aspheric optics can be considered a special case of freeform optics with an axis of rotational invariance that is, an aspheric surface has an axis, not required in general for freeform surfaces.

As used herein, the term "energizable" relates to a device or set of components that perform an indicated function upon receiving power and, optionally, upon receiving one or more enabling signals.

Figure 2:
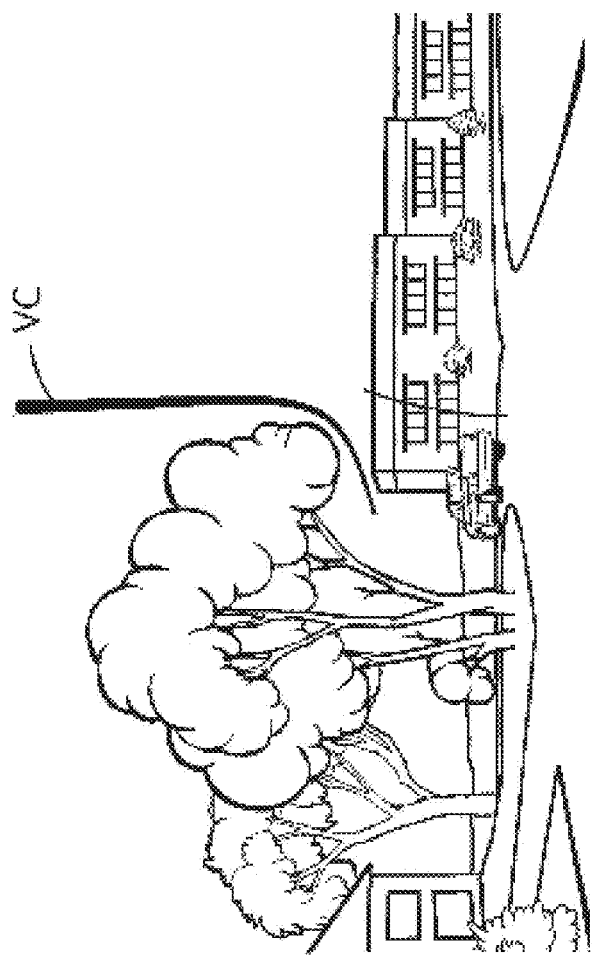
FIG. 2 is a plan view showing the representation of an existing virtual cable for a navigational guidance system using volumetric imaging.

In order to more fully understand aspects of embodiments of the present invention, it is instructive to consider a volumetric display for navigation assistance in one embodiment, as taught, for example, in the Grabowski et al. '1707 application cited earlier. In this application, an optical apparatus provides a heads-up display that presents a volumetric image to a driver of a motor vehicle. Referring to the schematic view of FIG. 1, there is shown a volumetric display 10 with a display device 12 that directs an image to a viewer 14, such as the driver of the motor vehicle. Light rays R1, R2, and R3 shown are reflected from a windshield 18 or other surface to form a virtual image that is volumetric and appears to be beyond the windshield, as represented by virtual rays R1', R2', and R3'. Line H represents a true horizontal with respect to the viewer. The image is formed within a spatial region termed an eye box 16. The viewer can then see the virtual image as a volumetric image when the viewer's eyes are within eye box 16. In one embodiment as shown in FIG. 2, the device described in the Grabowski et al. '1707 application displays a virtual cable VC that changes position as a navigation guide.

Figure 3:
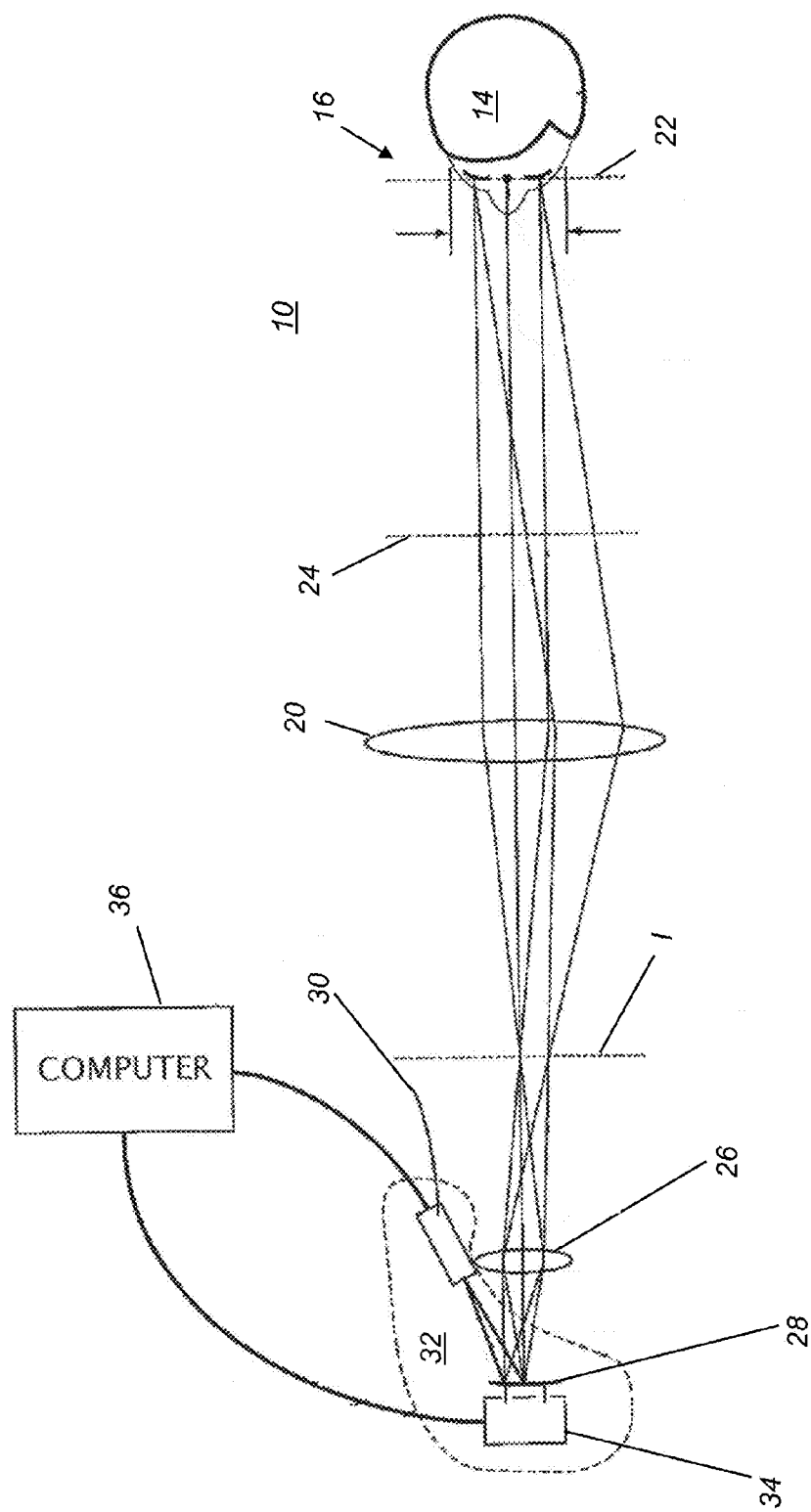
FIG. 3 is a schematic diagram showing the optical path used for volumetric imaging according to the embodiment shown in FIG. 1.
Figure 4:
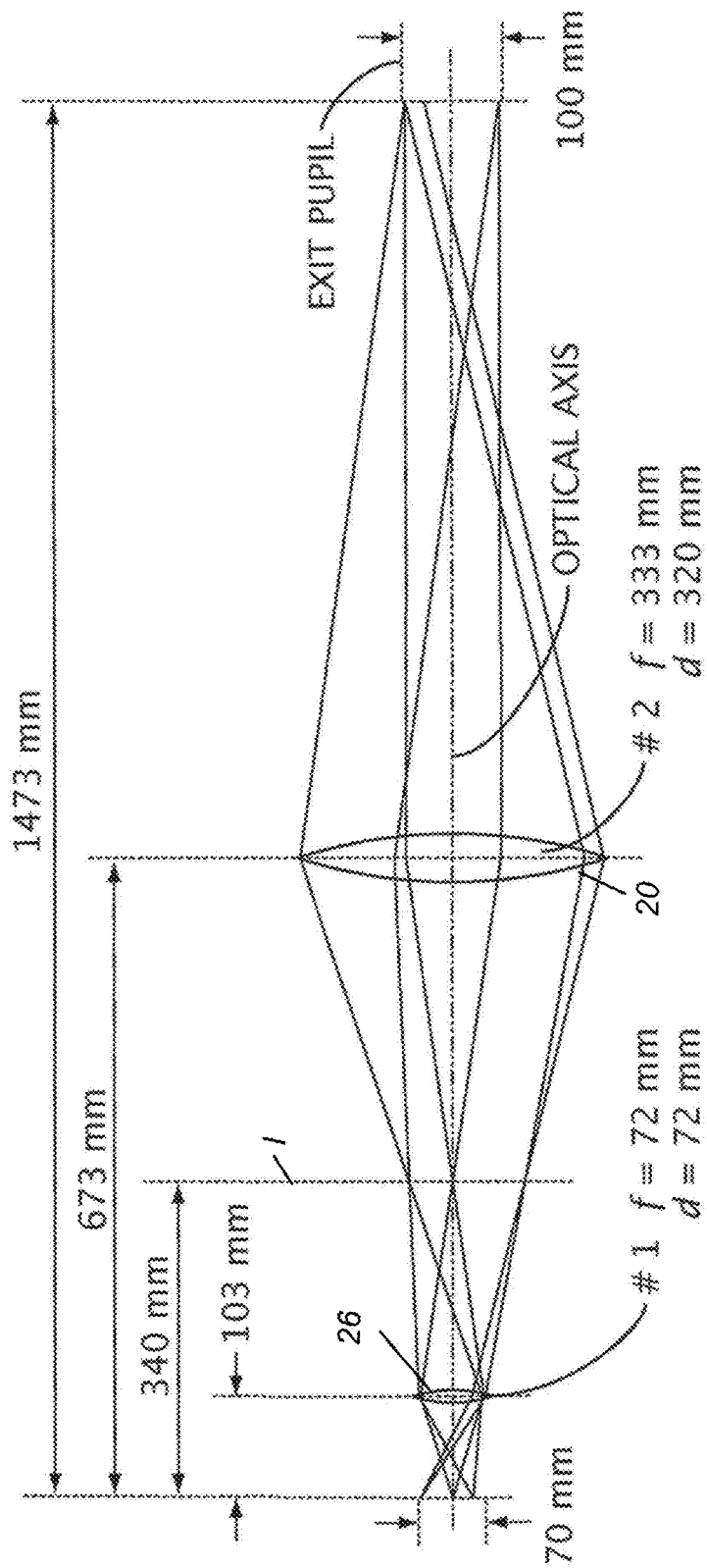
FIG. 4 is a schematic diagram showing the optical path used for an existing volumetric imaging with some exemplary dimensions for a proposed volumetric imaging apparatus.

The schematic diagrams of FIGS. 3 and 4 show elements of the optical system for volumetric display 10. A volumetric image generator 32 generates the source image by directing light from a light source 30 onto a diffusion screen 28. A projection screen actuator 34, such as a voice coil actuator or piezoelectric actuator, is energized to provide rapid, repeated movement of diffusion screen 28 back and forth along the optical axis, in order to provide a rapidly changing focal plane, preferably oscillating at a rate that is fast enough so that it is imperceptible to the human viewer, several times per second. A computer 36 provides the necessary logic for controlling and coordinating the writing and screen oscillation functions for providing the volumetric image.

Continuing with the description of FIG. 3, a relay lens 26 forms a real intermediate image I at the input focal plane of an eye lens 20. The imaged light is then directed to a combiner 24, typically at or near the windshield of a motor vehicle or other surface, such as a substantially flat transparent surface that is mounted onto a windshield, that combines the volumetric virtual image with the field of view of viewer 14. FIG. 4 shows the unfolded optical path of imaged light in one embodiment of the Grabowski et al. '1707 device.

The size requirements for volumetric system optics using such a system, however, can be considerable. In particular, a large exit pupil is needed in order to provide the volumetric image. Because a large pupil is needed, large lenses are used. Therefore, the optical system can be fairly expensive.

In response to the need for a more cost-effective and compact solution for volumetric imaging, the apparatus and methods of the present invention provide alternate optical designs using a one-dimensional pupil expander. The phrase "one-dimensional pupil expander" relates to expansion of the pupil with respect to one orthogonal axis, the vertical axis, with no appreciable effects on pupil size in the orthogonal horizontal axis. The use of a pupil expander, a type of beam expander, provides advantages in expanding the imaged light provided from the volumetric display along the vertical axis only. The use of pupil expansion in the vertical direction allows for a significantly reduced aperture size in the vertical direction for the optical components and thus makes it possible to fold the optical path in the vertical direction, while conditioning the horizontal light distribution to reduce distortion and aberrations, for a more compact arrangement. Due to the small aperture size of the system in the vertical y direction and the large aperture in the horizontal x direction, the angular movement at the diffuser surface is largely in the horizontal x direction, with little or no movement needed in the vertical y direction. The diffuser can thus be a linear diffuser that accepts the projected illumination at low numerical aperture without essentially changing divergence in the vertical y direction but provides significant diffusion in the horizontal x direction in order to fill the large horizontal biocular pupil.

Pupil expanders have been developed for use with various types of two-dimensional (2-D) displays, such as with Liquid-Crystal Devices (LCDs). Pupil expanders or extenders enable relatively small optical systems, with correspondingly small pupils, to provide a system output with a larger effective pupil for ease of viewing. For example, U.S. Patent Application Publication No. 2006/0126182 entitled "General Diffractive Optics Method for Expanding an Exit Pupil" by Levola teaches using an arrangement of holographic surfaces for 2-D pupil expansion. Another type of pupil expander is described in U.S. Pat. No. 7,391,573 entitled "Substrate-Guided Optical Devices" to Amitai. The Amitai '573 disclosure describes the use of a light guide having parallel outer surfaces and two or more partially reflective inner surfaces for light redirection.

Earlier pupil expanders, such as those described in the Levola '6182 and Amitai '573 disclosures, preserve the field angle as they expand the pupil. There are, however, a number of significant differences between the pupil expander used in embodiments of the present disclosure and earlier pupil expanders similar to those described in the Levola and Amitai disclosures, including the following:

(i) Because earlier pupil expanders were designed for use with stereoscopic near-to-eye displays, such as goggles, these devices were necessarily small and binocular, providing suitable convergence, but exhibiting poor accommodation. Namely, the displays presented data as if on a screen at a predefined distance in front of the viewer. The volumetric display needed for use in a motor vehicle, however, must be auto-stereoscopic, requiring no additional eyewear, such as viewing glasses, that would impede driver ability. In addition, a volumetric display of this type must be biocular, so that both of the viewer's eyes share the same optics. Thus, both accommodation and convergence attributes need to be correctly displayed.

(ii) Earlier pupil expanders were required to expand the pupil in both the vertical and horizontal dimensions, which was typically accomplished by employing two expanders in series, one for the vertical direction and another for the horizontal, with the associated cost and complexity and exhibiting a number of artifacts.

(iii) Conventional devices using pupil expanders were designed for augmented reality, with see-through combiners for the viewer. Thus, earlier systems were prone to light scattering, for example, such as when the sun is positioned within the field of view or just outside this field, creating a noticeable "dirty windshield" artifact as incident sunlight is scattered from the many partially reflective surfaces in front of the viewer's eyes.

(iv) Conventionally, pupil expanders are positioned vertically with respect to the optical axis, so that projected light emerges normal to major surfaces. This arrangement, however, can present a mechanical impediment as well as obstructing visibility of other objects.

(v) Conventional pupil expanders are light-guide type expanders that project the light by reflection from one or more light guide surfaces before exiting the device.

Unlike conventional pupil expander applications, embodiments of the present disclosure expand the pupil in the vertical direction only. This helps to reduce system complexity, albeit at the cost of a somewhat larger dimension in the horizontal direction. In embodiments of the present disclosure, the pupil expander, with its series of a number of partial reflectors, is separated from the windshield combiner so that the outside world is not viewed through the expander. This eliminates a number of possible scattering artifacts, as described above, such as when the sun or other sources are present. Advantageously, embodiments of the present disclosure use a pupil expander that outputs projected light at a highly oblique angle relative to a normal to its output surface. The output surface of the pupil expander can be generally flush with the top of the car dashboard, with the output light directed appropriately at an oblique slant towards the windshield, so that upon reflection from the windshield, the light reaches the eyes of the viewer. Embodiments of the present disclosure also direct light without requiring reflection from external surfaces of the pupil expander. The full field of view of the expander is combined within the trapezoidal expander; thus, the partial reflectors in the pupil expander described herein are significantly easier to design and implement and less expensive than earlier alternatives, since they do not have to provide the angle selection required in earlier pupil expanders.

With volumetric displays such as that shown in the Grabowski et al. '1707 disclosure, the problem becomes even more complex. Light must be handled differently in the vertical and horizontal directions. Where a large pupil is presented to both eyes, it is not feasible to expand the pupil in the horizontal direction and preserve convergence in this direction at the same time. Thus, for volumetric displays of this type, pupil expansion can be permitted only in the vertical direction, where no convergence is provided. At the same time, the system must maintain a suitable pupil size in the horizontal direction to provide properly convergent display information to the viewer.

Embodiments of the present disclosure address a number of difficulties faced by conventional solutions for volumetric display apparatus in the automotive environment, including those described subsequently.

Compacting the Optical System

Figure 5:
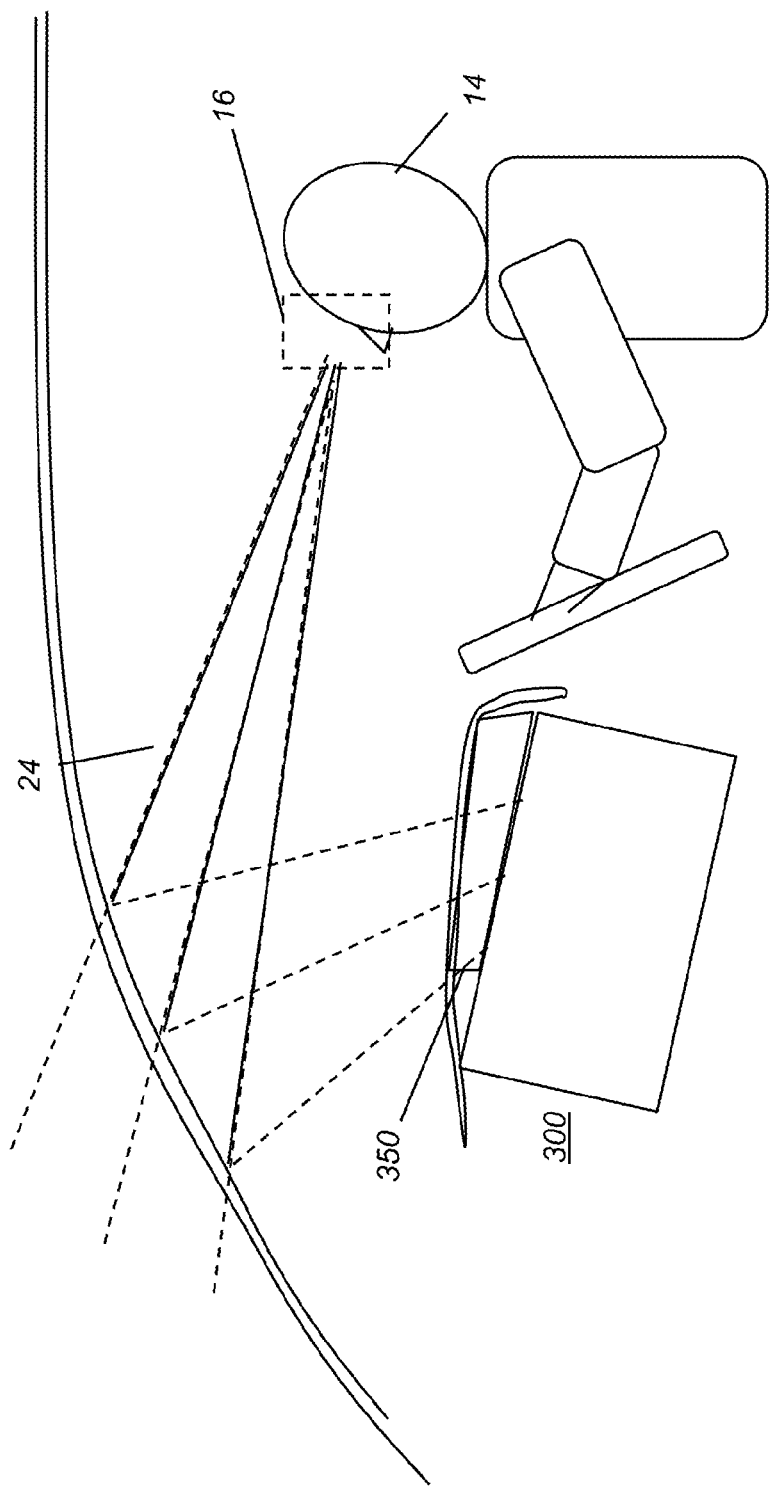
FIG. 5 is a schematic diagram showing the positioning of volumetric imaging apparatus according to an embodiment of the present disclosure.

The cross-sectional schematic view of FIG. 5 shows how a volumetric imaging apparatus 300 using a pupil expander 350 is positioned in order to form eye box 16 for viewer 14 in a motor vehicle, according to an embodiment of the present disclosure. Pupil expander 350, described in more detail subsequently, is positioned at an angle to horizontal and can be substantially even with the top of the vehicular dashboard. For the light rays shown, convergence is achieved when eye box 16 lies in the paths of rays to both left and right eyes. As shown in FIG. 5, the use of pupil expander 350 allows the optics of volumetric imaging apparatus 300 to be folded into a more compact form than with earlier volumetric imaging systems. It should be noted that pupil expansion in the vertical direction is particularly advantageous for navigational guide applications that provide an image that extends predominantly in one direction, such as for the virtual cable described in the Grabowski et al. '1707 reference. As noted earlier, pupil expansion in the horizontal direction not desirable, since visual cues for convergence are predominantly horizontal.

With respect to image quality, compactness, and a number of performance aspects, embodiments of the present disclosure provide a number of improvements over earlier volumetric imaging solutions using strategies that employ polarization-changing techniques and use of reflective relay optics for image path folding, wherein the reflective optics further help to reduce or eliminate a number of image aberrations common to refractive optical systems. In addition, embodiments shown herein also provide convergence correction that compensates for windshield angle and curvature, so that the volumetric image that is formed more closely approximates the angular characteristics of actual scene content.

The terminology "S-polarization" and "P-polarization", familiar to those skilled in the optical arts, relates to the plane in which the electric field of a light wave oscillates and to the surface upon which the light is incident. Light having P-polarization, or "P-polarized" light, has its polarization in the meridional plane. Light having S-polarization, or "S-polarized" light, has its polarization perpendicular to the meridional plane, wherein the meridional plane is the plane that contains the surface normal and the propagation vector of the incoming and outgoing light radiation. In general, S-polarization is more highly reflected than P-polarization. Polarization beam splitters (PBS), also termed polarizing beam splitters, are commonly designed to commonly reflect light having S-polarization and transmit light having P-polarization, although it is possible to design and implement PBS coatings that exhibit the opposite behavior.

Figure 6A:
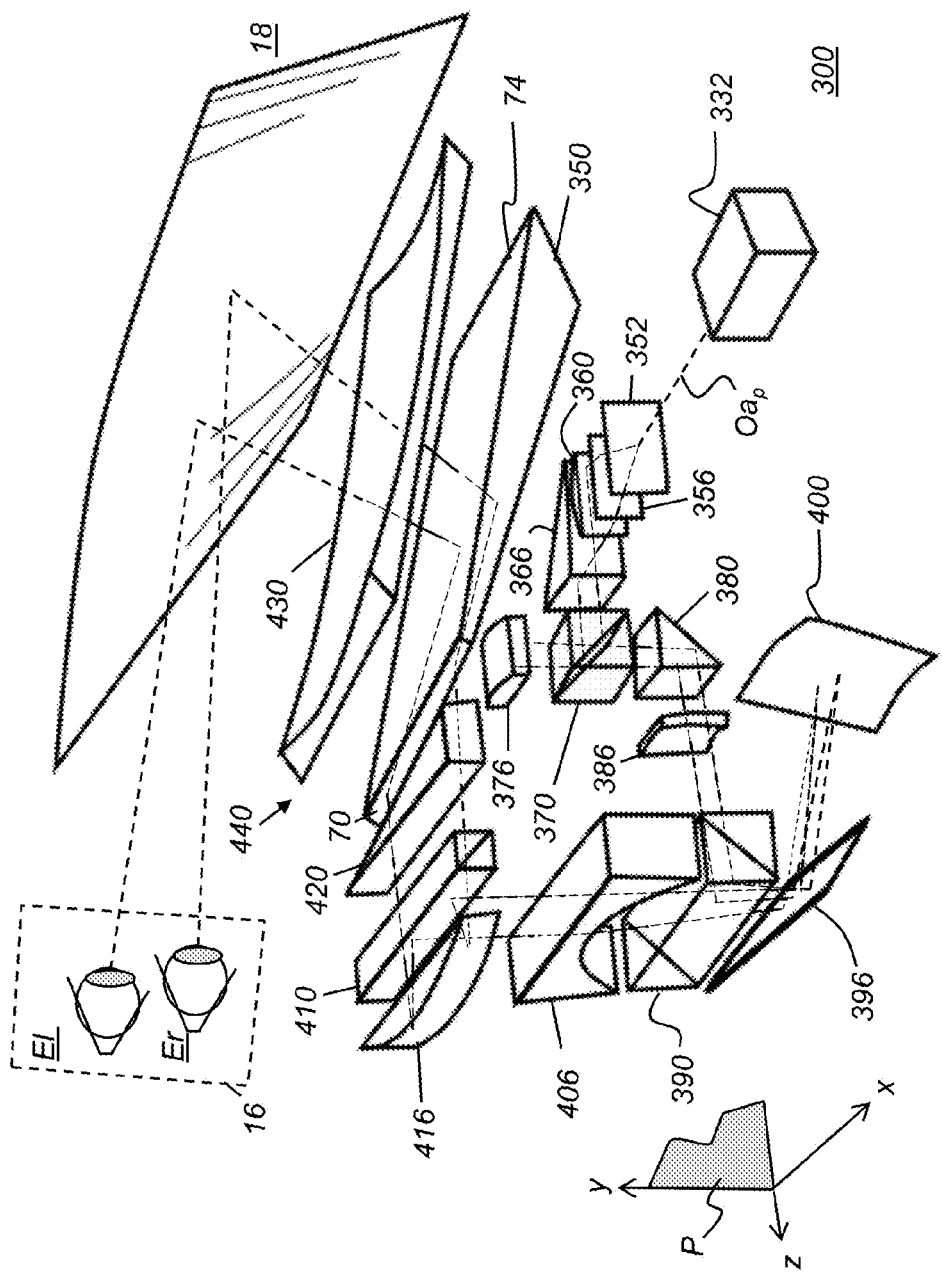
FIG. 6A is a schematic exploded diagram showing the optical path used for volumetric imaging according to an embodiment of the present disclosure as mounted in a motor vehicle.
Figure 6B:
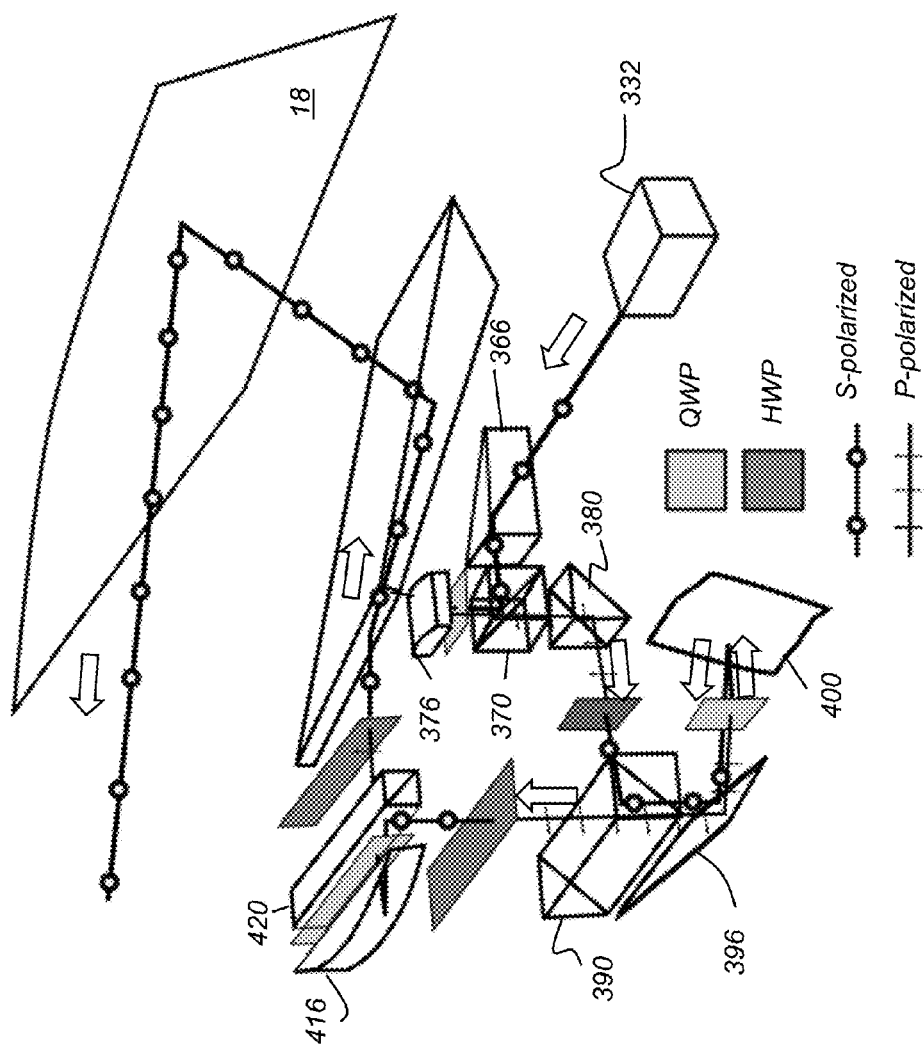
FIG. 6B is a schematic exploded diagram that shows polarization state changes along the light path.

Embodiments of the present disclosure provide a catadioptric optical system that includes both reflective (catoptric) and refractive (dioptric) components. FIG. 6A is a schematic view of components of an embodiment of a volumetric imaging apparatus 300 according to the present disclosure. FIG. 6A is shown in exploded-view form for better visibility of components and light direction. It should be noted that optical paths at various points overlap, but are shown spaced apart in FIGS. 6A and 6B for clarity. Overlap occurs, for example, when rays are retro-reflected, which occurs at a number of reflective surfaces. FIG. 6B shows the light polarization handling that is provided for volumetric imaging apparatus 300, with a portion of the optical components removed for clarity and with the position of polarization retarders, quarter wave plates QWP and half wave plates HWP, for polarization rotation indicated.

Referring to both FIGS. 6A and 6B, a volumetric image generator 332 is energizable to form the image on a diffusion screen 352. Diffusion screen 352 lies along a projection optical axis $OA_p$ and lies within a y-z-parallel plane, using the x-, y-, and z-axis definitions shown in FIG. 6A. The image on diffusion screen 352 is the input image for a monocentric catadioptric imaging apparatus 440. The image-bearing light is S-polarized. Light is directed through a cylindrical lens 356. An aspheric lens 360 directs the image-bearing light to an x-fold prism 366 that folds the light path in the horizontal (x) direction. With respect to the Cartesian coordinate axes shown in FIG. 6A, prism 366 folds the optical axis $OA_p$ 90 degrees, so that the light path lies within the same x-z-parallel plane but is now parallel to the y-z plane. This directs light so that the path of image-bearing light now travels in directions parallel to the y-z plane, while the extent of the light in the direction of the x-axis is preserved. X-fold prism 366 reflects the light to a polarization beam splitter (PBS) 370 that, in turn, directs the light to a relay mangin mirror 376. It should be noted that X-fold prism 366 may be optional, since it may be permissible to reposition volumetric image generator 332 without a fold in the horizontal direction in various alternate embodiments, depending largely on the design of the motor vehicle in which apparatus 300 is installed.

Relay mangin mirror 376 directs the light back through PBS 370 to a y-fold prism 380. Y-fold prism 380 folds the light path in the vertical (y) direction, directing light through a lens 386 and a PBS 390 and toward a mirror 396. Mirror 396 directs the light to a reflective field mirror 400 that directs the light back into mirror 396 and through PBS 390 that transmits the light through a plano-toroidal lens 406 to a PBS 410.

Continuing with the optical path in FIG. 6A, PBS 410 directs the light to a primary curved mirror 416 and redirects the light back through PBS 410 and to a wedge prism 420, used to realign the light path to compensate for the driver's position.

Within monocentric catadioptric imaging apparatus 440, following the optional x-fold needed in the FIG. 6A embodiment, the image-bearing light follows a light path that extends substantially symmetrical to, and substantially in parallel with, a vertical y-z plane, with components and light distribution within apparatus 440 generally symmetrical about a vertical y-z plane that bisects curved relay mangin mirror 376 and curved primary mirror 416. For reference, a small portion of a vertical plane P1 that has this relationship for bisecting imaging apparatus 440 curved mirror components is represented in FIG. 6A. Reflective surfaces, polarization retarder surfaces, and PBS surfaces that are used to fold the light path are substantially orthogonal to the vertical plane P1.

Monocentric catadioptric imaging apparatus 440 does not provide horizontal pupil expansion, but conditions the image-bearing light in the horizontal direction, such as to reduce image aberrations as the light is directed toward pupil expander 350.

The light from mirror 416 then goes to vertical pupil expander 350. The light input surface 70 of vertical pupil expander 350 is orthogonal to the y-z plane of surface 352. The light then exits the image expander 350 along its exit surface 74 at an oblique angle and goes through a convergence corrector 430 that conditions the image-bearing light to the surface form of windshield 18. Exit surface 74 is in a plane that is orthogonal to the y-z plane. Windshield 18 thus provides the combiner surface for directing light into the left and right eyes El and Er of the viewer, respectively.

Primary curved mirror 416 provides the light field for image expander 350. In the optical arrangement of FIG. 6A, primary mirror 416 and relay mirror 376 are essentially concentric, through the folded optical path, having their respective centers of curvature approximately within eye box 16. This makes volumetric imaging apparatus 300 a monocentric optical system, as the term is used by those skilled in the optical design arts.

Monocentric design offers a number of advantages and helps to reduce image aberrations. However, monocentric design can be difficult to adapt to optical systems in which space is at a premium. In general, monocentric systems have the same performance in all fields of view, allowing expansion to larger fields when compared against non-monocentric systems. It must be noted that the use of the term "monocentric" in optical design is, in practice, less rigid than the strict geometric definition of a monocentric system that requires perfectly concentric surfaces. In an optical system, for example, it is often not feasible or even desirable to design a system that is perfectly geometrically monocentric. In the instant case, for example, both of the viewer's eyes cannot be positioned at the same fixed point and some amount of tolerance must be allowed for the viewer's eye box.

Monocentric optical systems are characterized by a relatively high degree of symmetry for its curved surfaces. Thus, the term "monocentric" indicates that the system design form has two or more of the curved surfaces of the system substantially concentric, with reasonable allowance for optical tolerances and scale. In the case of the imaging apparatus 300 shown in FIG. 6A, the substantially concentric curved surfaces of primary mirror 416, relay mirror 376, and toroidal lens 406 have their respective centers of curvatures in close proximity to each other, such as within 30 mm or within 10-20 mm or less for a volumetric imaging apparatus scaled for use in a motor vehicle. This center of curvature can lie between prism 380 and PBS 390, for example.

FIG. 6B shows the progression of polarization changing that is used for folding the light path to allow compact packaging for the pupil-expanding optics and helps to enable monocentric design. S-polarized light is reflected at prism 366, mirror 396 (in the incoming direction) and at each of PBS devices 370, 390 and 420, as well as against windshield 18. P-polarized light is transmitted through PBS devices 370, 390 and 420. The polarization state of the light is shown schematically as it changes along the optical path. The relative positions of QWPs and HWPs are also shown. Where retro-reflection is provided, the optical path passes twice through a QWP, changing polarization from S- to P-polarization, for example, at mirror 400. The PBS prisms shown in the FIGS. 6A and 6B embodiment reflect S-polarized and transmit P-polarized light; an opposite arrangement could alternately be effected using PBS prisms or wire grid plates that transmit S-polarized light and reflect P.

Figure 7:
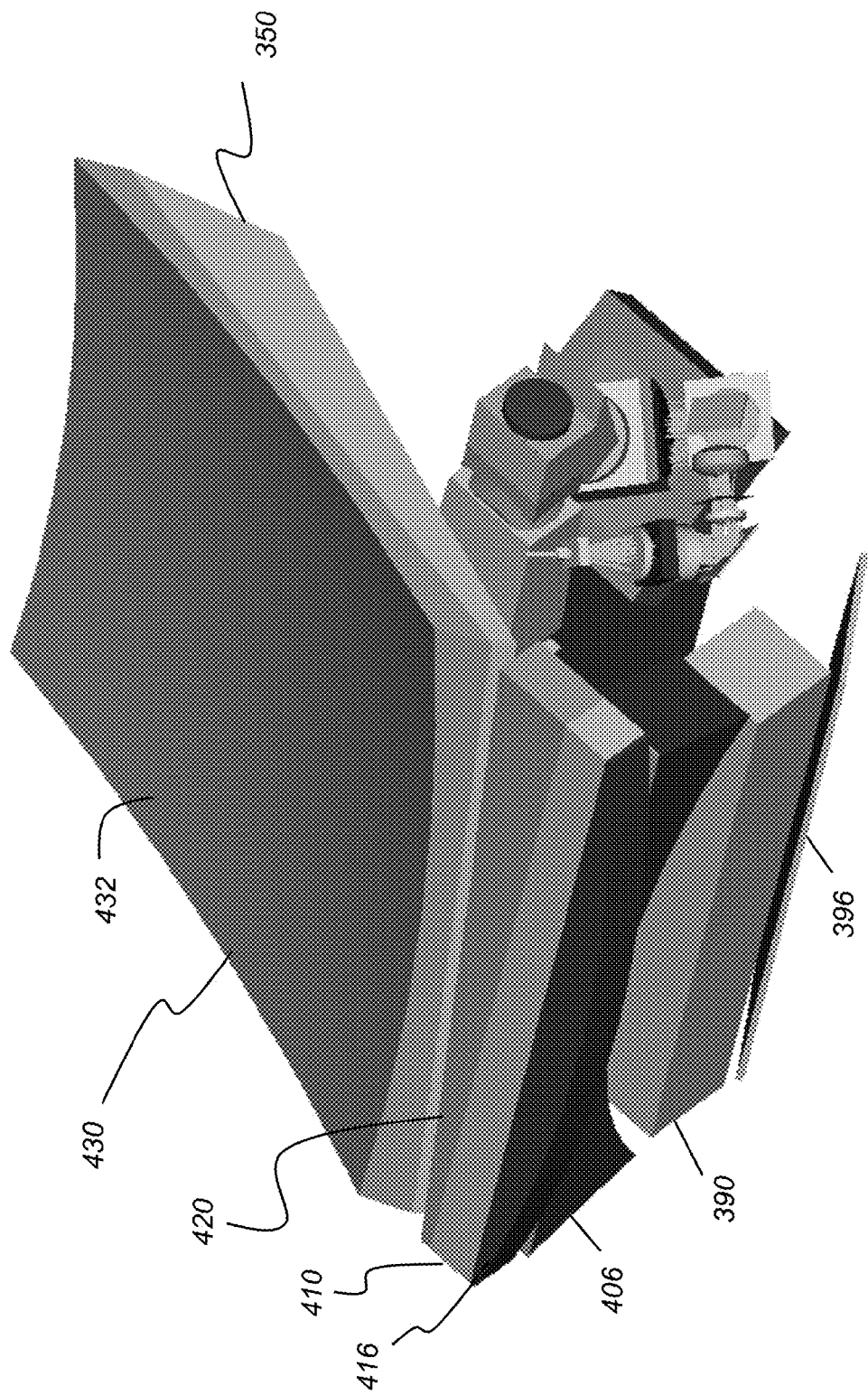
FIG. 7 is a front perspective view that shows the volumetric imaging apparatus as a compact optical assembly.

The perspective view of FIG. 7 shows a front view of the volumetric imaging apparatus 300 as configured for installation in the dashboard of a vehicle. Convergence corrector 430 can have its top surface 432, the output surface for directing image-bearing light obtained from pupil expander 350 toward the windshield, flush with the top of the automobile dashboard, for example, or sloped at an appropriate angle for dashboard compatibility.

Polarization beam splitters (PBS) are shown as cubes, but can alternately be wire grid polarizers from Moxtek, Inc., Orem UT, for example. Even better efficiency could be obtained using a polarization-preserving diffuser as diffusion screen 352, since the projection system 332 which generates the image at the diffuser is also monocentric and is designed to generate polarized light. One example of a polarization-preserving diffuser is disclosed in U.S. Pat. No. 6,381,068 entitled "Reflective Projection Screen and Projection System" to Takashi Harada et al.

In response to the need for a lower cost pupil expander that expands the pupil in a single orthogonal dimension, embodiments of the present invention use a modified pupil expander design. Pupil expander 350, shown in cross-section in FIG. 8A, has major surfaces 78 and 74 that, instead of being in parallel, are obliquely disposed with respect to each other. Pupil expander 350 has its light exit surface 74 that is disposed in a substantially horizontal plane. In the context of the present disclosure, a "substantially horizontal" plane is considered to be horizontal to within no more than +/−18 degrees and can be at the tilt angle and height of the automotive dashboard. Internally, pupil expander 350 has a number of partially reflective surfaces 72, each of which reflects a portion of the light from the input surface of pupil expander 350 outward through exit surface 74.

Figure 8A:
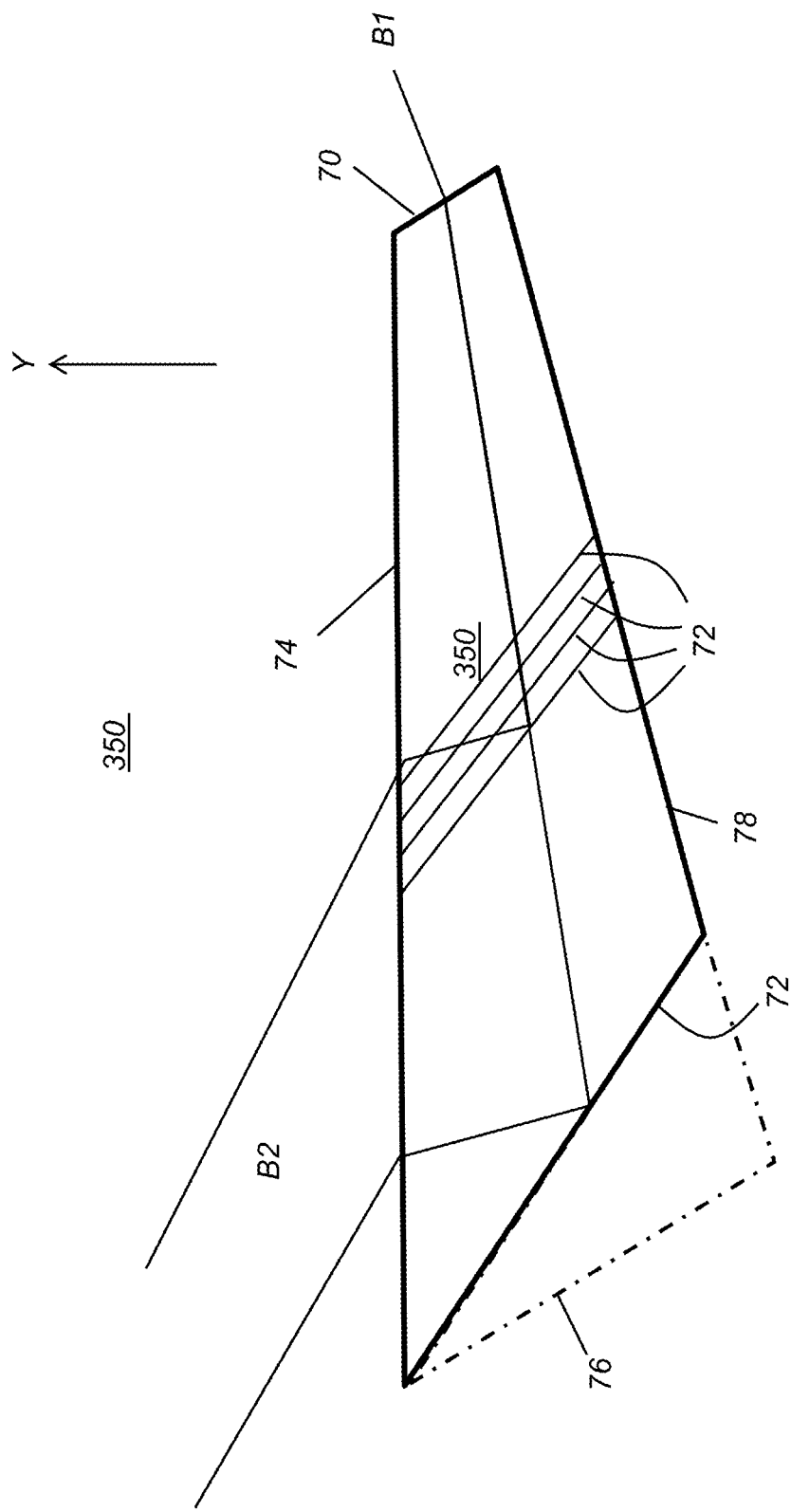
FIG. 8A is a side view schematic showing behavior and structure of a pupil expander.

In the embodiment shown in FIG. 8A, a light entrance surface 70 accepts the image-bearing light from the optical system of volumetric imaging apparatus 300. Pupil expander 350 in this embodiment is narrow at light entrance surface 70. With this arrangement, an input beam B1 of image-bearing light is partially reflected at each of a number of internal partially reflective surfaces 72 to provide an expanded output beam B2. A number of surfaces 72 are evenly distributed in parallel internal to pupil expander 350; only a small number of these surfaces are shown in FIG. 8A for clarity. In alternate embodiments, pupil expander 350 could be the type of pupil expander taught in the Amitai '573 disclosure or could use holographic elements in place of partially reflective surfaces 72. In FIG. 8A, the tunnel diagram that is represented with surface 76 shows pupil expander 350 to have the form of a plane parallel plate with respect to incident light.

Figure 8B:
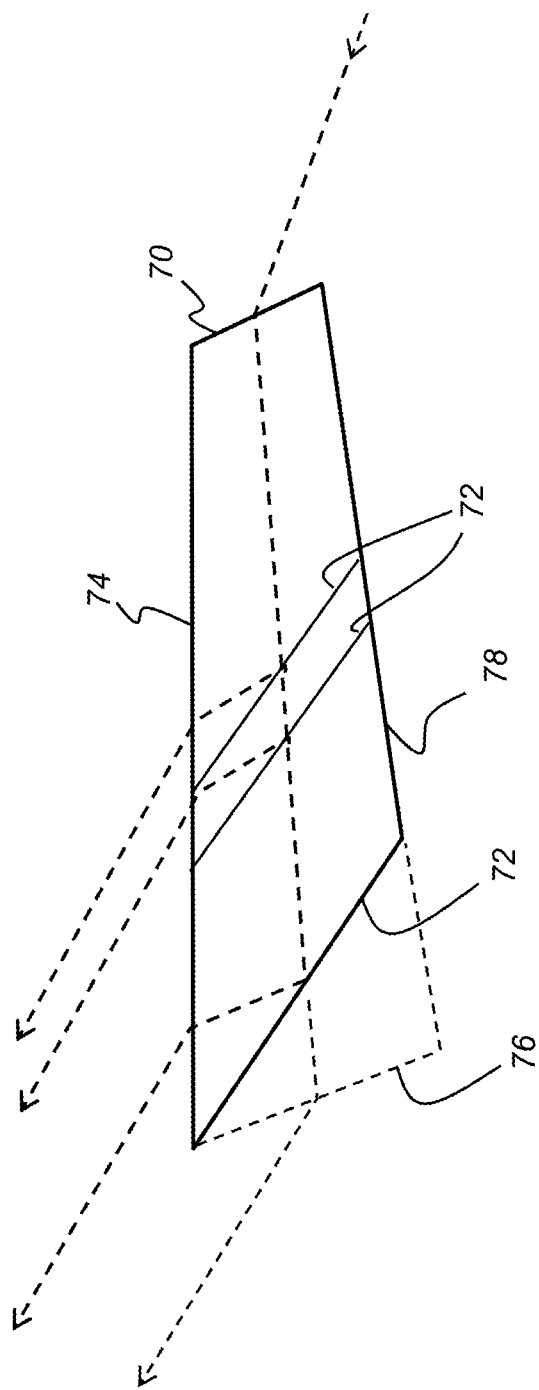
FIG. 8B shows an alternate embodiment of the pupil expander.
Figure 8C:
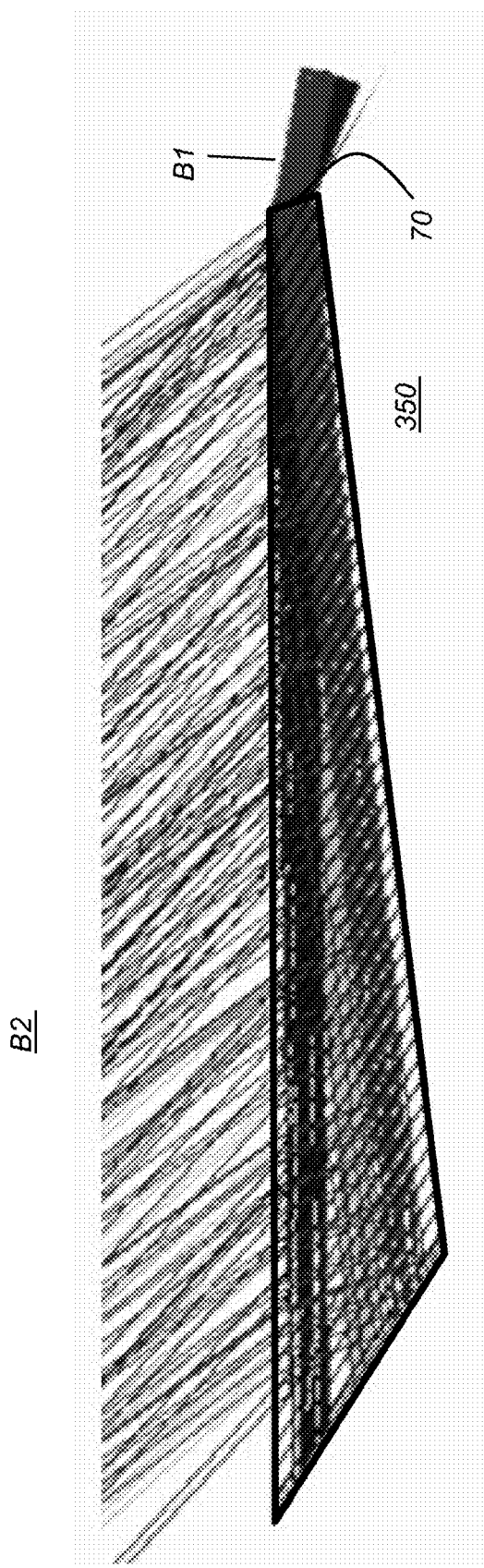
FIG. 8C is a side view that shows light handling behavior of the pupil expander.

FIG. 8B shows an alternate embodiment of pupil expander 50 that has its input surface 70 parallel to tunnel diagram surface 76 to reduce or eliminate color dispersion. FIG. 8C shows the behavior of pupil expander 350 for redirecting beam B1 to provide vertical pupil expansion.

Fabrication of Pupil Expander 350

Pupil expander 350 can be formed from a number of slices of a glass substrate, with individual coatings provided on one or both major, interfacing surfaces of the substrate slices. Slices can then be adhesively bonded to each other to form the complete structure of pupil expander 350. This method, however, requires different coating arrangements for each slice, to allow for partial reflection of an increasingly diminishing amount of light along the length of pupil expander 350.

Figure 8D:
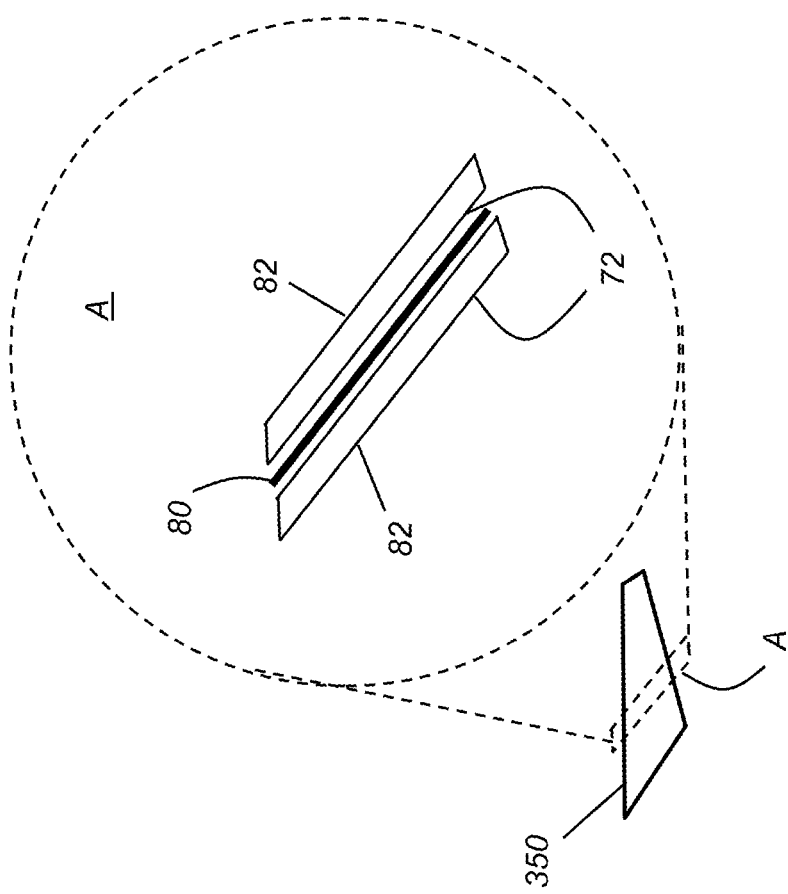
FIG. 8D is a side view showing fabrication details for a portion of the pupil expander according to an embodiment of the present disclosure.

FIG. 8D shows an alternate fabrication arrangement using an optical adhesive 80 between slices 82. An enlarged portion A shows two slices 82 of glass that are adjacent to each other within pupil expander 350. By varying the index of refraction of optical adhesive 80 from one slice 82 to the next, the reflectance of each coating on surface 72 can be effectively varied. One type of optical adhesive that allows changed formulation for altering the index of refraction in this way is NOA 61 UV-cured adhesive produced by Norland Products, Cranbury, N.J., for example. The refractive index of the NOA61 adhesive is 1.56. Norland also makes the NEA123 formulation, with a refractive index of 1.61. Different intermediate indices of refraction can be obtained by mixing components having low and high indices of refraction in proportion and thus the control of the reflectivity of the successive partial reflectors that are arranged in parallel within pupil expander 350 can be done by controlling proportions of the optical adhesive mixture, as opposed to controlling the gradual variation of the reflectivity of the partial correctors by using a significant number of different coatings.

Correcting for Convergence Error in the Horizontal

The curvature of the windshield is a factor in causing convergence error and generally varies from one vehicle design to another. Embodiments of the present disclosure correct for convergence discrepancies using convergence corrector 430.

Figure 9A:
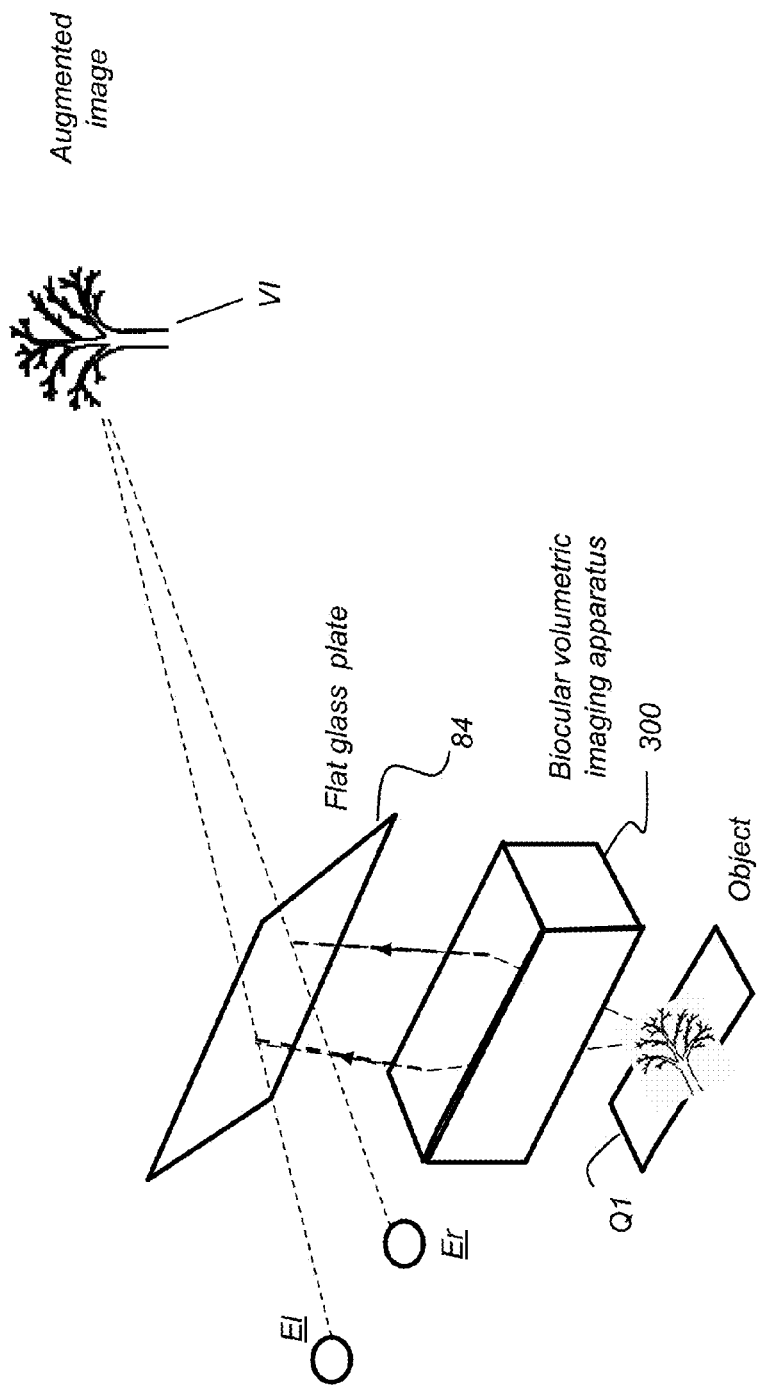
FIG. 9A is a schematic view that shows normal convergence when using a flat combiner surface.

FIG. 9A shows convergence for a volumetric imaging system using a flat plate 84 as combiner. A real image Q1 is formed by a projector or other apparatus. With the use of a flat surface, correct convergence can be maintained for a virtual image VI that is projected onto eyes El, Er by the biocular volumetric imaging apparatus 300.

Figure 9B:
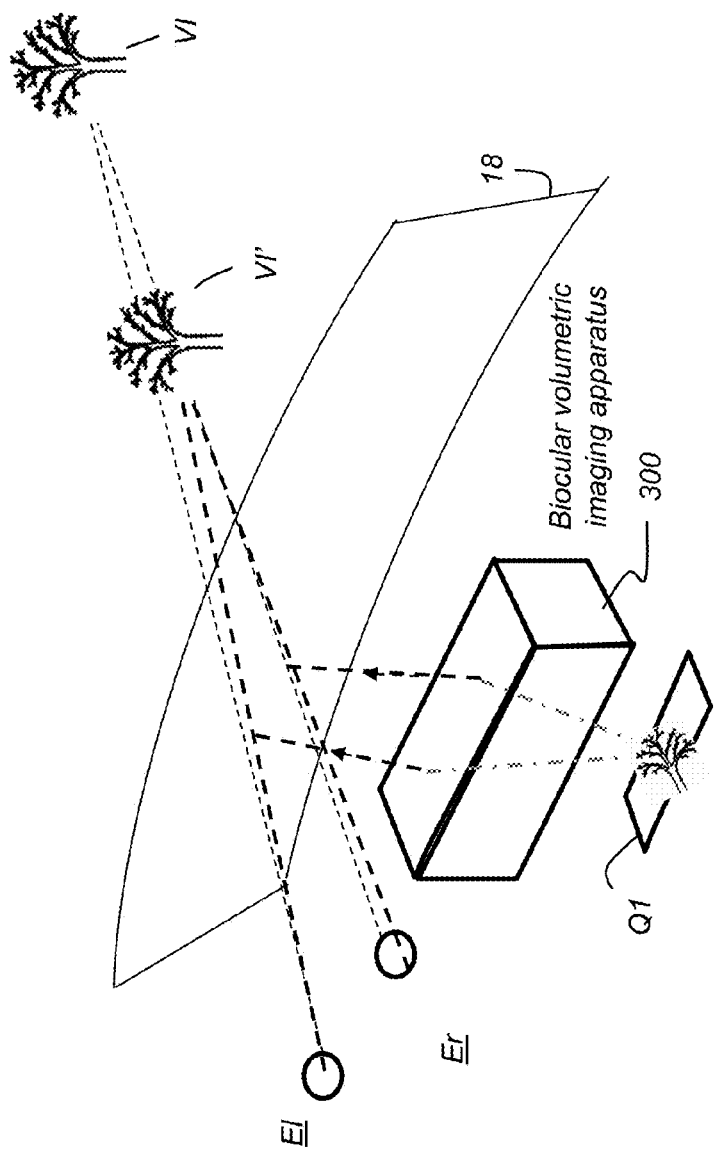
FIG. 9B is a schematic view that shows convergence error when using a curved windshield as a combiner surface.

With the introduction of windshield curvature, convergence problems begin to appear. FIG. 9B shows convergence error for a volumetric imaging system using a windshield 18. Without compensation, convergence error confuses the viewer's visual system and causes the projected virtual image VI to appear to eyes El and Er at a different position than the intended position, appearing to be formed at the incorrect position labeled as VI'.

Figure 9C:
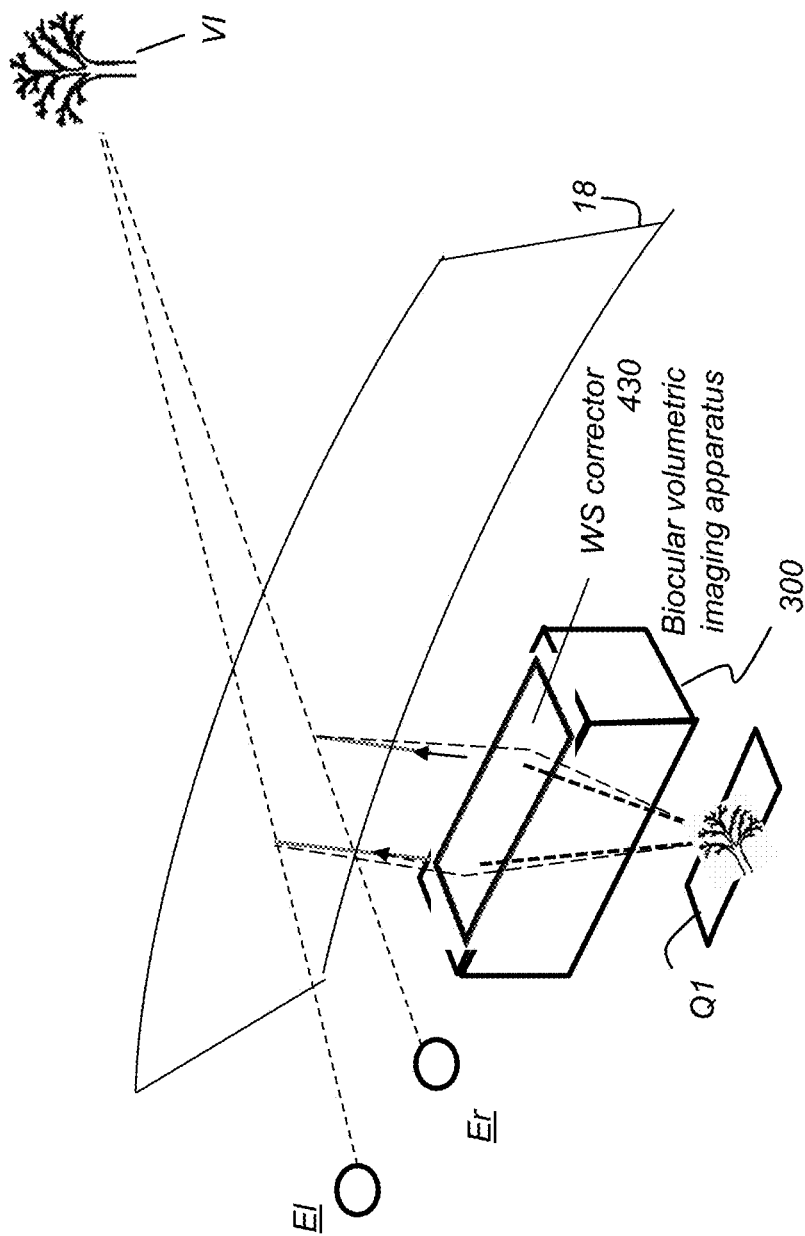
FIG. 9C is a schematic view showing use of a convergence corrector for a volumetric imaging apparatus.

FIG. 9C shows how convergence corrector 430 operates to correct for convergence error caused when using windshield 18 as combiner for virtual and actual (real) image content. The convergence error shown with respect to FIG. 9B is effectively eliminated.

Figure 9D:
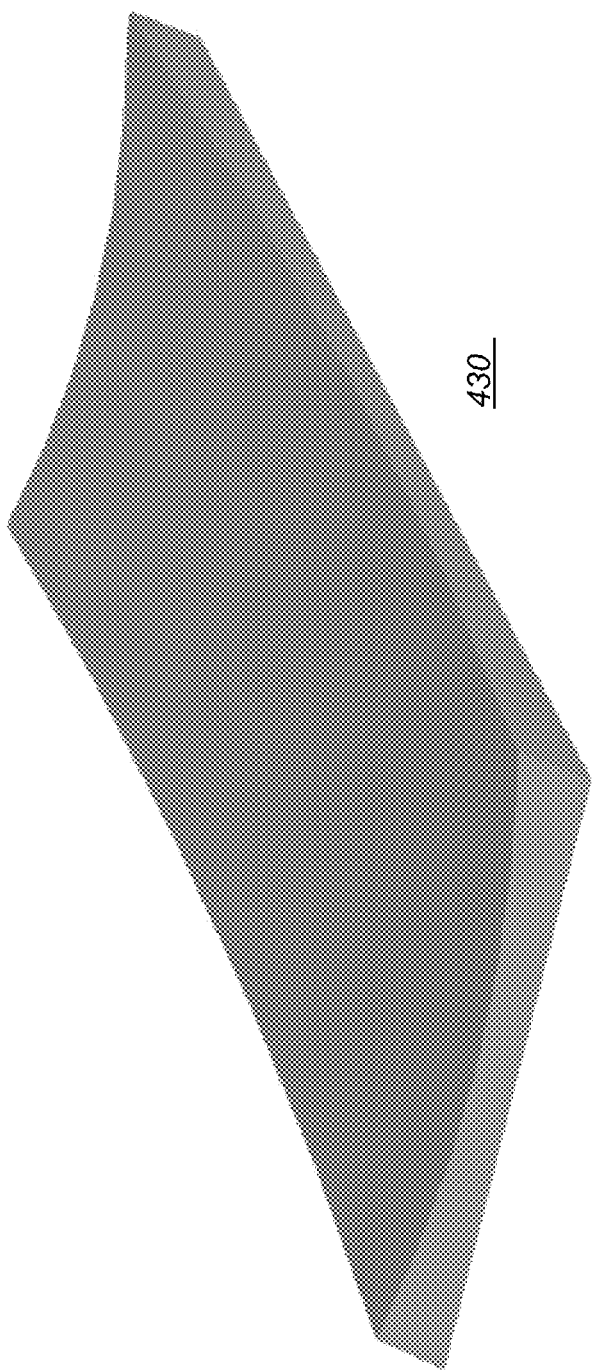
FIG. 9D is a perspective view of a convergence corrector according to an embodiment of the present disclosure.

FIG. 9D shows a perspective view of convergence corrector 430. Corrector 430 is a free-form refractive element, such as a surface termed an XY polynomial surface, that is designed by measuring the amount of error and calculating the correction needed over a range of points along the projected visual field. Interpolation between the calculated points enables lens design to fashion the surface curvature for the output surface of convergence corrector 430.

The use of convergence corrector 430 enables volumetric imaging apparatus 300 to be readily adapted for different vehicles, such as for different automobile models, for example. Thus, the volumetric imaging apparatus can be installed in different types of automobiles or other vehicles, each having a distinctive windshield form.

The light from the image generator, volumetric image generator 332, forms a real image on diffusion screen 352. The optical system conditions the light beam in the vertical direction, with different magnification in the horizontal direction. Pupil expander 350 provides expansion of the vertical or Y axis without appreciable magnification of the horizontal X axis. Horizontal pupil expansion is not desirable for this type of system, as noted earlier.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. While the system is well suited for applications in navigational guidance, it also has applications also in the field of "augmented imaging" in which useful information is displayed in combination with visual scenery.

Thus, what is provided is an apparatus and method for volumetric imaging using a one-dimensional pupil expander.

The invention claimed is:

1. A volumetric imaging apparatus comprising:
   a volumetric image generator that is energizable to form an image on a display surface as an input to a monocentric catadioptric imaging apparatus,
   the monocentric catadioptric imaging apparatus having a light path for image-bearing light from the display surface, wherein the light path extends substantially symmetrically with respect to a vertical plane that extends through a curved relay mirror and a curved primary mirror,
   wherein the monocentric catadioptric imaging apparatus comprises a plurality of reflective surfaces disposed to fold the light path between the curved relay mirror and the curved primary mirror to condition the distribution of the image-bearing light in a horizontal direction that is substantially orthogonal to the vertical plane,
   wherein the light path of the monocentric catadioptric imaging apparatus directs light from the curved primary mirror toward a light input surface of a vertical pupil expander, wherein the vertical pupil expander has a light exit surface that is substantially orthogonal to the vertical plane, and
   wherein the light exit surface directs light through a free-form corrector for horizontal convergence and toward a windshield for display.

2. The apparatus of claim 1 wherein the volumetric image generator further comprises an actuator that is energizable to move the display surface within the range of focal positions.

3. The apparatus of claim 1 wherein the monocentric catadioptric imaging apparatus further comprises at least one beam splitter and a curved mirror in the path of imaged light directed to the vertical pupil expander.

4. The apparatus of claim 3 wherein the at least one beam splitter is a polarization beam splitter and further comprising a quarter wave plate disposed in the path of image-bearing light between the beam splitter and the curved mirror.

5. The apparatus of claim 1 wherein the curved relay mirror and curved primary mirrors and a curved toroidal lens in the light path are monocentric.

6. The apparatus of claim 1 wherein the vertical pupil expander comprises a plurality of partially reflective surfaces.

7. The apparatus of claim 1 wherein the input surface and any of the partial reflectors perform as a plane parallel plate with respect to an incident light beam.

8. The apparatus of claim 7 wherein the light exiting the pupil expander is slanted at an oblique angle with respect to the normal of the output surface of the expander.

9. The apparatus of claim 1 wherein the free-form corrector has an output surface that is shaped according to the windshield form.

10. The apparatus of claim 6 wherein the vertical pupil expander is formed using an adhesive interface between surfaces in the plurality of reflective surfaces, and wherein adhesive portions exhibit a monotonically increasing or decreasing index of refraction.

11. The apparatus of claim 1 wherein the vertical pupil expander comprises a plurality of holographic surfaces.

12. The apparatus of claim 1 wherein the image generator comprises a polarized laser, wherein the display surface is a polarization-preserving diffusion screen, and further comprising a plurality of polarization beam splitters that direct light through optical components.

13. The apparatus of claim 1 where the display surface is a one dimensional diffuser, spreading light only in the horizontal direction.

14. A volumetric imaging apparatus for display on a windshield of a motor vehicle, the apparatus comprising:
   an image generator that is energizable to form an image onto a diffusive display surface that lies along an optical axis;
   a first turning prism that folds the optical axis in a substantially horizontal plane and directs light toward an optical apparatus comprising:
   (i) a relay mirror;
   (ii) a primary mirror that is concentric with the relay mirror;
   (iii) a toroidal lens that is concentric with the relay mirror;
   (iv) a plurality of polarization beam splitters, a plurality of polarization retarders, and a plurality of reflective elements that are disposed to further fold the optical axis between the relay mirror, toroidal lens, and primary mirrors;
   a vertical pupil expander that receives light from the primary mirror at a light input surface and outputs the received light from a light exit surface that directs image-bearing light at an oblique to horizontal; and
   a free-form corrector that conditions the image-bearing light for biocular display according to the form of the windshield.

15. The volumetric imaging apparatus of claim 14 wherein the free-form corrector can be changed to allow adaption of the apparatus to a different vehicle type.

16. A volumetric imaging apparatus for display on a vehicle windshield, the apparatus comprising:
   a volumetric image generator comprising an image source that is energizable to project an image along a projection axis onto a diffusive surface as an input image to a monocentric catadioptric imaging apparatus,
   wherein the monocentric catadioptric imaging apparatus has an optical path with a plurality of folds that direct the image-bearing light from a curved relay mirror, through a toroidal lens, and to a curved primary mirror, wherein the relay mirror, toroidal lens, and primary mirror have substantially the same center of curvature,
   wherein the monocentric catadioptric imaging system further comprises a plurality of beam splitters and polarization retarders for changing the polarization state of the image-bearing light for folding the optical path;
   a vertical pupil expander that receives light from the optical path, having an exit surface that outputs image-bearing light from the primary mirror at an oblique angle; and
   a refractive convergence corrector disposed between the exit surface of the pupil expander and the windshield to provide a corrected biocular image to a viewer.

17. The imaging apparatus of claim 16 further comprising a turning prism that directs the optical path orthogonally with respect to the projection axis and substantially parallel with the diffusive surface.

* * * * *